United States Patent
Honzawa et al.

(10) Patent No.: US 11,467,021 B2
(45) Date of Patent: Oct. 11, 2022

(54) ELECTRONIC BALANCE DISPLAYING A MAGNITUDE OF EXTERNAL DISTURBANCE IN REAL TIME

(71) Applicant: A&D COMPANY, LIMITED, Tokyo (JP)

(72) Inventors: Tomoaki Honzawa, Saitama (JP); Yuji Fukami, Saitama (JP)

(73) Assignee: A&D COMPANY, LIMITED, Tokyo (JP)

(*) Notice: Subject to any disclaimer, the term of this patent is extended or adjusted under 35 U.S.C. 154(b) by 79 days.

(21) Appl. No.: 17/053,231

(22) PCT Filed: Jun. 19, 2019

(86) PCT No.: PCT/JP2019/024246
§ 371 (c)(1),
(2) Date: Nov. 5, 2020

(87) PCT Pub. No.: WO2020/008880
PCT Pub. Date: Jan. 9, 2020

(65) Prior Publication Data
US 2021/0293603 A1    Sep. 23, 2021

(30) Foreign Application Priority Data
Jul. 5, 2018    (JP) ............................. JP2018-128011

(51) Int. Cl.
*G01G 7/02*    (2006.01)
*G01G 23/00*    (2006.01)

(52) U.S. Cl.
CPC .............. *G01G 7/02* (2013.01); *G01G 23/00* (2013.01)

(58) Field of Classification Search
CPC .......... G01G 7/02; G01G 23/00; G01G 23/01; G01G 23/37
See application file for complete search history.

(56) References Cited

U.S. PATENT DOCUMENTS 5,130,938 A  *  7/1992  Inoue .................... G01G 3/147
                                                              702/194
2013/0306382 A1  11/2013  Izumo et al.
(Continued)

FOREIGN PATENT DOCUMENTS

| JP | 2012-154878 A | 8/2012 |
| WO | 2012-032574 A1 | 3/2012 |

OTHER PUBLICATIONS

International Search Report and Written Opinion issued in the corresponding Application No. PCT/JP2019/024246 dated Jul. 16, 2019.

*Primary Examiner* — Natalie Huls
(74) *Attorney, Agent, or Firm* — Roberts Calderon Safran & Cole P.C.

(57) ABSTRACT

Provided is an electronic balance that enables a user to recognize the magnitude of disturbances in real time. An electronic balance (1) whose natural frequency is known, includes a load measurement mechanism (4) configured to detect weighing data (Zn), and an arithmetic processing unit (8) configured to perform arithmetic processing by using the weighing data (Zn), wherein the arithmetic processing unit (8) extracts a vibration component (Fr) of the natural frequency from the weighing data (Zn) detected by the load measurement mechanism (4) and displays the vibration component (Fr) of the natural frequency. By using the vibration component (Fr) of the natural frequency as an index of disturbances, it becomes possible to recognize in real time the magnitude of the disturbances during weighing.

3 Claims, 9 Drawing Sheets

(56) References Cited

U.S. PATENT DOCUMENTS

2017/0052058 A1\* 2/2017 Ito .................... G01G 23/06
2017/0222674 A1\* 8/2017 Shiramizu ............ H04L 67/12
2020/0386605 A1\* 12/2020 Oren ................... G01G 3/14

\* cited by examiner

| $h_0, h_{28}$ | $1.74 \times 10^{-3}$ |
| --- | --- |
| $h_1, h_{27}$ | $-1.04 \times 10^{-2}$ |
| $h_2, h_{26}$ | $1.41 \times 10^{-2}$ |
| $h_3, h_{25}$ | $4.46 \times 10^{-3}$ |
| $h_4, h_{24}$ | 0 |
| $h_5, h_{23}$ | $7.4 \times 10^{-3}$ |
| $h_6, h_{22}$ | $4.00 \times 10^{-2}$ |
| $h_7, h_{21}$ | $5.08 \times 10^{-2}$ |
| $h_8, h_{20}$ | $-1.52 \times 10^{-2}$ |
| $h_9, h_{19}$ | 0 |
| $h_{10}, h_{18}$ | $2.61 \times 10^{-2}$ |
| $h_{11}, h_{17}$ | $-1.53 \times 10^{-1}$ |
| $h_{12}, h_{16}$ | $-2.38 \times 10^{-1}$ |
| $h_{13}, h_{15}$ | $1.15 \times 10^{-1}$ |
| $h_{14}$ | $4.00 \times 10^{-1}$ |

ELECTRONIC BALANCE DISPLAYING A MAGNITUDE OF EXTERNAL DISTURBANCE IN REAL TIME

CROSS-REFERENCE TO RELATED APPLICATIONS

The present application is a U.S. National Phase of PCT/JP2019/024246 filed on Jun. 19, 2019, which claims priority to Japanese Patent Application No. 2018-128011 filed Jul. 5, 2018. The disclosure of the PCT Application is hereby incorporated by reference into the present Application.

TECHNICAL FIELD

The present invention relates to an electronic balance, and specifically, to an electronic balance with high weighing accuracy such as an analytical balance and a microelectronic balance.

BACKGROUND ART

In electronic balances such as electromagnetic force type electronic balances, disturbances such as vibration and wind are detected as load fluctuations by a load detection unit and appear as variations in weighing results, and therefore become factors in causing weighing errors.

In Patent Literature 1, environmental measurement data such as an atmospheric pressure and a temperature relating to causes for disturbances and a weighing value are displayed in correlation with each other so as to allow a user to visually recognize environmental conditions.

CITATION LIST

Patent Literature
[Patent Literature 1] Japanese Published Unexamined Patent Application No. 2012-154878

SUMMARY OF INVENTION

Technical Problem

However, in Patent Literature 1, it is necessary to repeatedly weigh the same weight to confirm the presence or absence of a disturbance, more specifically, the magnitude of a disturbance, and therefore, during this weighing, weighing of a specimen cannot be performed.

There are various causes for disturbances, and these change from moment to moment, and a user has a need for first simply knowing the magnitude of a disturbance in real time rather than the cause.

The present invention provides an electronic balance that enables a user to recognize the magnitude of a disturbance in real time.

Solution to Problem

In order to achieve the object described above, an aspect of the present invention provides an electronic balance whose natural frequency is known, including a load measurement mechanism configured to detect weighing data, and an arithmetic processing unit configured to perform arithmetic processing by using the weighing data, wherein the arithmetic processing unit is configured to extract a vibration component of the natural frequency from the weighing data detected by the load measurement mechanism, and display the vibration component of the natural frequency.

According to this configuration, since there is a correlation between a disturbance and a vibration component of the natural frequency, a user can recognize the magnitude of a disturbance in real time based on the vibration component of the natural frequency.

In an aspect of the present invention, the arithmetic processing unit is configured to display the vibration component of the natural frequency by representation using staged levels. The magnitude of a disturbance can be confirmed not as a numerical value but as a level, so that a user can grasp the magnitude of a disturbance at a glance.

In an aspect of the present invention, the arithmetic processing unit is configured to display in real time a weighing value calculated from the weighing data detected by the load measurement mechanism and the vibration component of the natural frequency.

By displaying both of the weighing value and the vibration component of the natural frequency, a user can observe both of these in correlation with each other, and can easily estimate disturbances.

The vibration component of the vibration frequency is a value obtained by performing filtering to extract only a vibration component near the natural frequency from the weighing data, and then applying data processing by taking the absolute values and averaging the absolute values for a predetermined time. The value of the extracted vibration component of the natural frequency easily fluctuates, and therefore numerical processing is applied so as to make it easy for a user to recognize the magnitude of a disturbance, so that a user can easily grasp the disturbance with a stable value.

Effect of Invention

According to the configuration disclosed herein, an electronic balance that enables a user to recognize the magnitude of a disturbance in real time can be provided.

DESCRIPTION OF EMBODIMENTS

Hereinafter, a detailed embodiment of an electronic balance of the present invention is described with reference to the drawings. The embodiment is not intended to limit the invention but is an illustration of the invention, and all features described in the embodiment and combinations of the features are not necessarily essential for the invention.

(Block Diagram)

Figure 1:
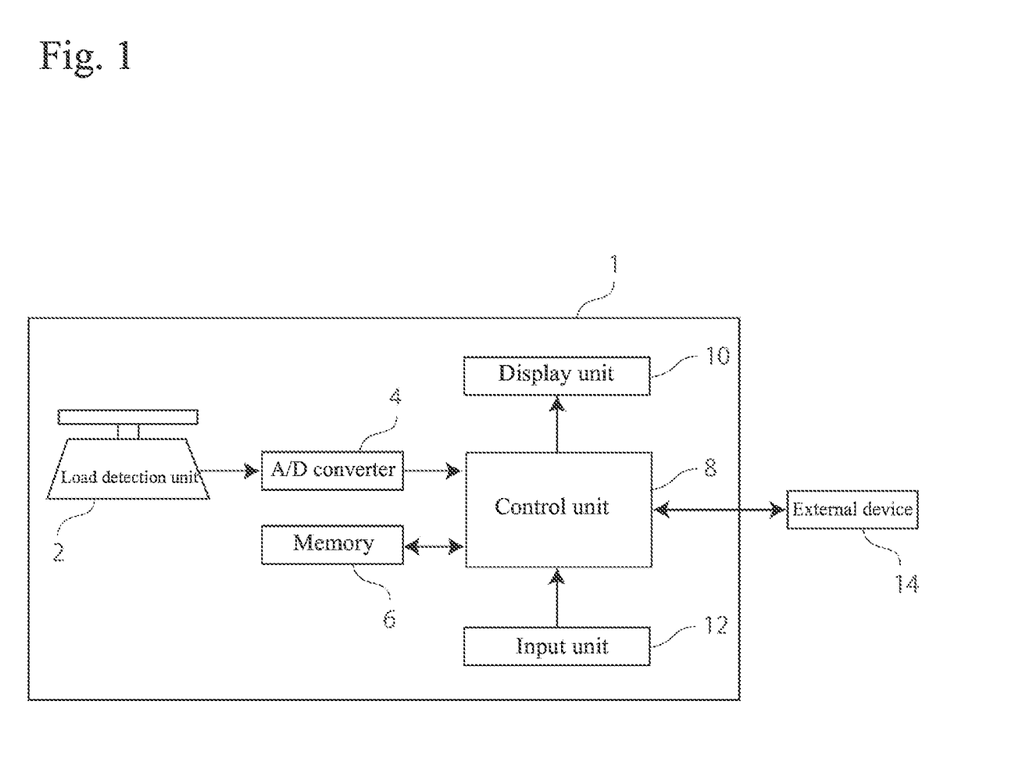
FIG. 1 is a block diagram of an electronic balance according to an embodiment of the present invention.

FIG. 1 is a block diagram of an electronic balance 1 according to an embodiment of the present invention. The electronic balance 1 includes a load detection unit 2, an A/D converter 4, a memory 6, a control unit 8, a display unit 10, and an input unit 12.

The load detection unit 2 is a so-called electromagnetic force type load sensor, and is a mechanism to detect a load placed on a weighing pan equipped in the electronic balance 1 by balancing a mechanical balance mechanism by using a position detector and an electromagnet.

The A/D converter 4 is a device to convert an analog signal into a digital signal, and an analog signal detected by the load detection unit 2 is converted into a digital signal by the A/D converter 4.

The control unit 8 consists mainly of a well-known microcomputer including a CPU, a ROM, a RAM, an I/O, and a bus line connecting these components. Among these, the CPU is configured to execute various types of processing, such as control of the display unit 10 and the input unit 12 and arithmetic processing of a digital signal output from the A/D converter 4, based on a program stored in the ROM by using the RAM as a work area. The arithmetic processing is performed by a mounted electric circuit as well as by a stored program.

The memory 6 is a nonvolatile storage device, and correction values and calibration data to be used for the arithmetic processing described above are stored in the memory 6. The memory 6 may be configured integrally with the control unit 8 by using a portion of the control unit 8.

The display unit 10 is a display for displaying information such as a weighing value W, a vibration component Fr of a natural frequency described later, and a state, and the input unit 12 is a key switch capable of inputting commands and numerical values.

To the electronic balance 1, an external device 14 is connected as necessary by various communication means such as wired or wireless communication means. The external device 14 is a terminal such as a PC or a tablet or a controller, and includes a display unit capable of displaying information.

A natural frequency of the electronic balance 1 is known by a well-known method such as calculation from output characteristics obtained when the vibration as a disturbance are applied to the control system of the balance 1 while fluctuating the frequency.

(Vibration Component Fr of Natural Frequency)

Figure 2A:
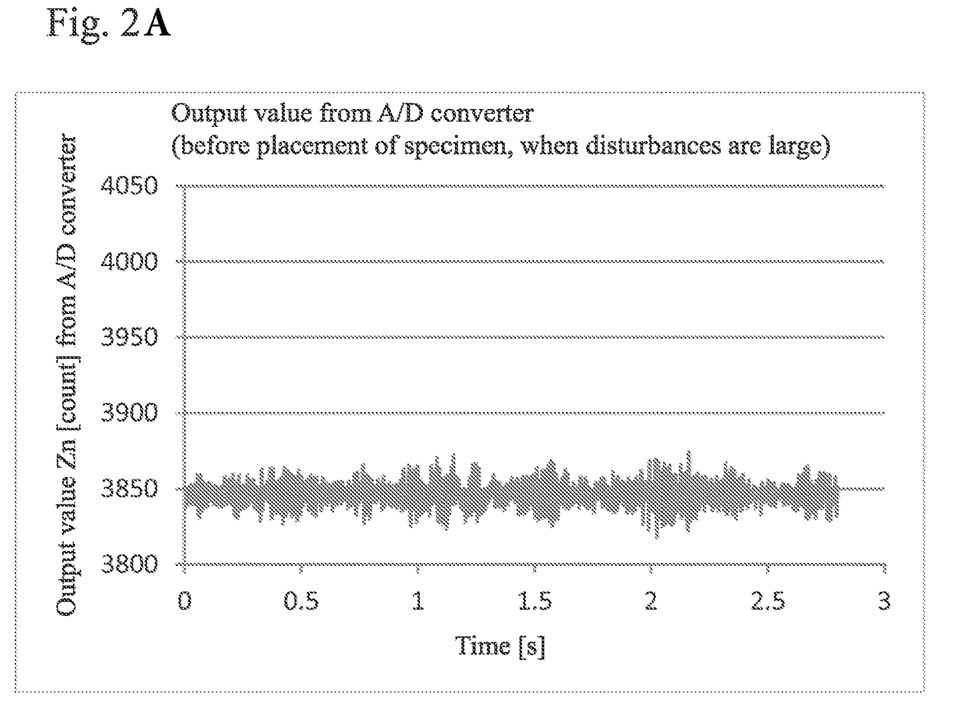
FIGS. 2A and 2B illustrate output values from an A/D converter (before placement of a specimen) when disturbances are large and small, respectively.
Figure 2B:
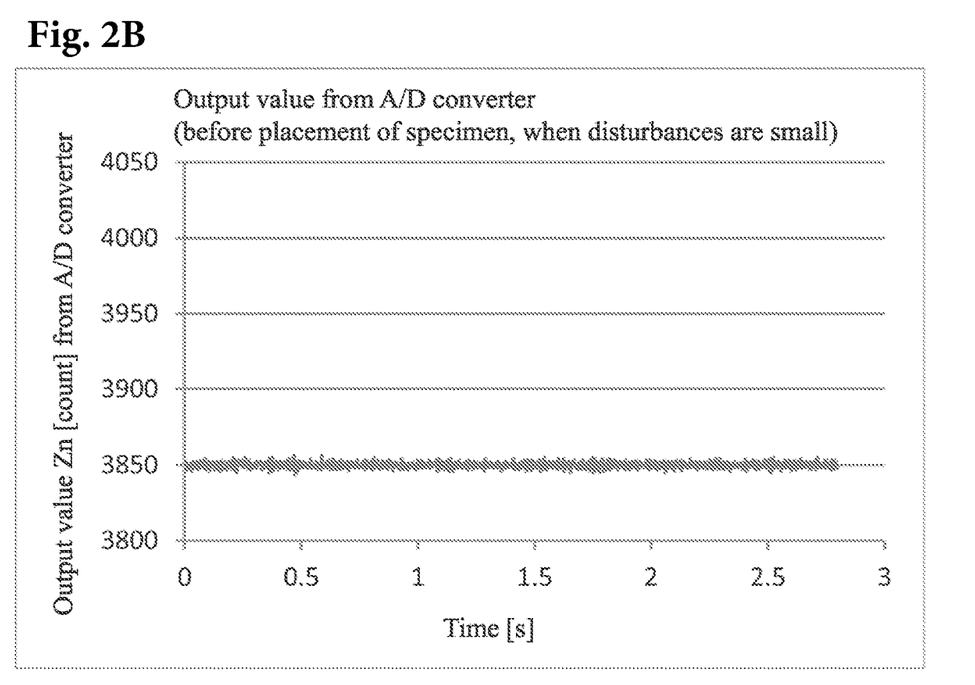

FIGS. 2A and 2B illustrate output values Zn from the A/D converter 4 before placement of a specimen on the weighing pan, in a case where—disturbances are large (wind speed: 0.5 m/s), and a case where—disturbances are small (wind speed: 0 m/s).

As illustrated in FIGS. 2A and 2B, even in a state where no specimen is placed on the weighing pan, the load detection unit 2 works so as to keep balance, so that an output value Zn is output from the A/D converter 4. The output value Zn from the A/D converter 4 fluctuates due to many factors (disturbances) such as vibration, static electricity, convection, and wind. It is impossible in fact to reduce any disturbance to zero, so that the output value Zn is output always with a certain level of amplitude. The larger the disturbance, the larger the amplitude, and the smaller the disturbance, the smaller the amplitude, and the output value Zn does not become constant. The same applies to a case where a specimen is placed, and the output value Zn is subjected to filtering by an electrical filter circuit or signal processing in the control unit 8, and then output as a weighing value W.

Figure 3A:
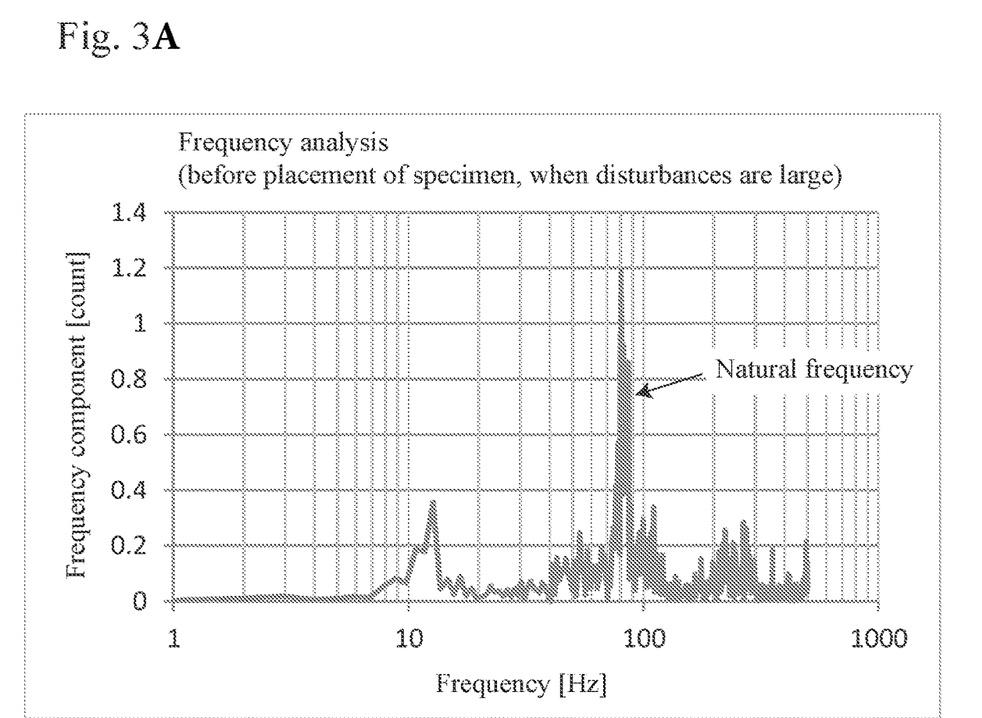
FIGS. 3A and 3B illustrate results of frequency analysis of the values illustrated in FIGS. 2A and 2B, respectively.
Figure 3B:
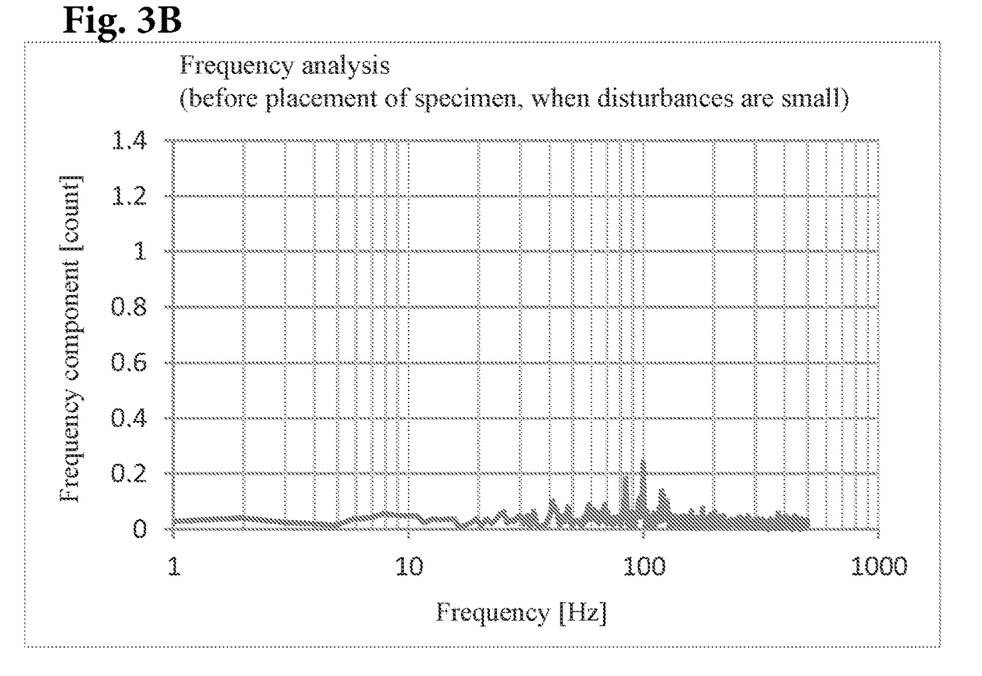

FIGS. 3A and 3B illustrate results of frequency analysis of the output values Zn in FIGS. 2A and 2B. As illustrated in FIG. 3B, when the disturbances are small the frequency component is not significant, and only when the disturbances are large as shown in FIG. 3A, does the output value Zn react strongly to the natural frequency of the electronic balance 1. This is because the electronic balance 1 vibrates at a natural frequency due to the disturbance, and the load detection unit 2 detects the vibration.

In other words, there is a correlation between the disturbance and the natural frequency component, and by extracting and displaying the vibration component at a natural frequency of the electronic balance 1 from the output value Zn of the A/D converter 4, a user can recognize the magnitude of the disturbance.

Based on this, in the present embodiment, the vibration component Fr of the natural frequency is used as an index to simply indicate in real time the magnitude of a disturbance that influences the electronic balance 1. The natural frequency refers to the known natural frequency of the electronic balance 1, and the vibration component of the natural frequency refers to a vibration component of the natural frequency of the electronic balance 1 in the output value Zn from the A/D converter 4.

On the display unit 10, the vibration component Fr of the natural frequency is displayed together with the weighing value W, and an operator can recognize the magnitude of a disturbance in real time based on the vibration component Fr of the natural frequency.

(Flowchart)

Figure 5:
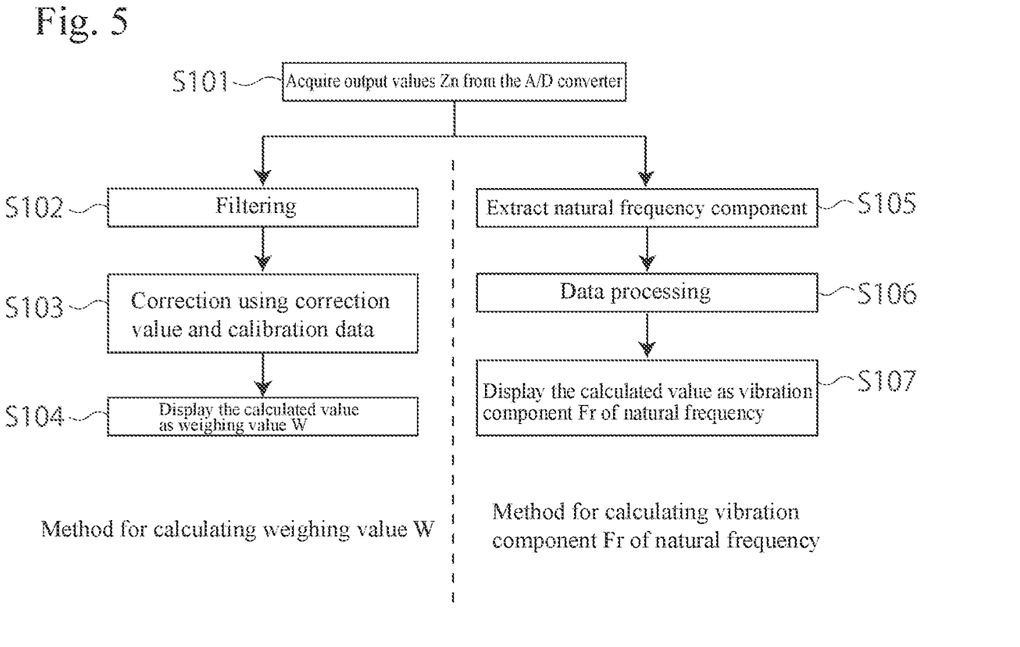
FIG. 5 is a flowchart of weighing.

FIG. 5 is a flowchart of weighing data processing in the electronic balance 1. The data processing is performed by the control unit 8, and calculation of the weighing value W and calculation of the vibration component Fr of the natural frequency are performed in parallel. Steps of weighing data processing in the electronic balance 1 are described in line with FIG. 5.

First, in Step S101, a load is detected as an analog signal by the load detection unit 2, and the analog signal is digitally converted by the A/D converter 4 and output as an output value Zn. The control unit 8 acquires this output value Zn, and based on the output value Zn, calculates the weighing value W and the vibration component Fr of the natural frequency.

First, a method for calculating the weighing value W is described.

In Step S102, the output value Zn is subjected to filtering. The filter is a so-called low-pass filter, and allows only a low-frequency component to pass through as a signal to filter out noise.

In Step S103, correction is performed based on correction values and calibration data stored in the memory 6. A magnet used for balancing in the load detection unit 2 changes in magnetic flux density due to temperature, and the mechanical mechanism inside the electronic balance 1 expands and contracts due to temperature. A correction value is, for example, for correcting this change due to temperature in accordance with the use state. In addition, gravitational acceleration changes according to the installation location of the electronic balance 1. The calibration data is data acquired when a weight with a known mass is placed, and based on this calibration data, the output value Zn is converted into mass date.

Last, in Step S104, the results of arithmetic operation described above are displayed by a stable numerical value as the weighing value W on the display unit 10.

Next, a method for calculating the vibration component Fr of the natural frequency is described. As an example, it is assumed that the natural frequency of the electronic balance 1 is 100 Hz, and the A/D converter 4 outputs data every 2 ms (sampling frequency: 500 Hz).

First, in Step S105, by using an FIR (Finite Impulse Response) filter as a bandpass filter, extraction processing is performed to cause only a frequency component near the natural frequency (100 Hz) of the electronic balance 1 to pass through from the output value Zn including various frequency components and attenuate other frequencies. The FIR filter is a filter that performs a numerical arithmetic operation by using successive data with a fixed cycle as an input and outputs results, and the characteristics of the filter change according to a coefficient by which the input data is multiplied, such as a low-pass filter, a high-pass filter, or a bandpass filter.

Figure 6:
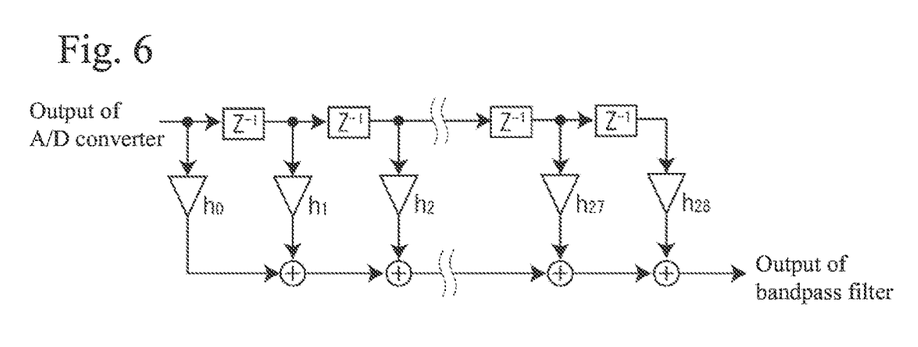
FIG. 6 is a block diagram of a bandpass filter.
Figure 7:
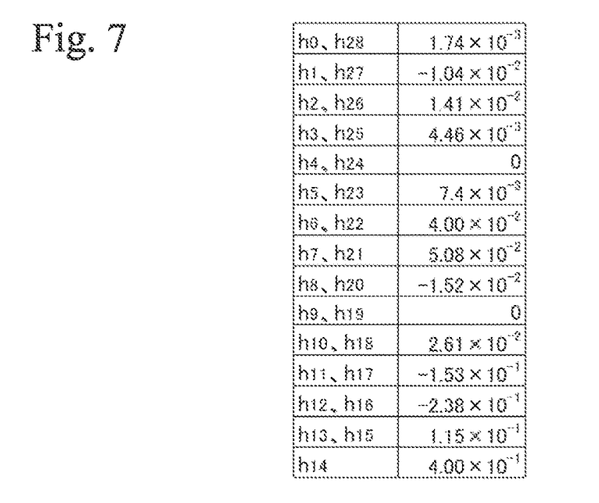
FIG. 7 is a table illustrating coefficients of the bandpass filter.
Figure 8:
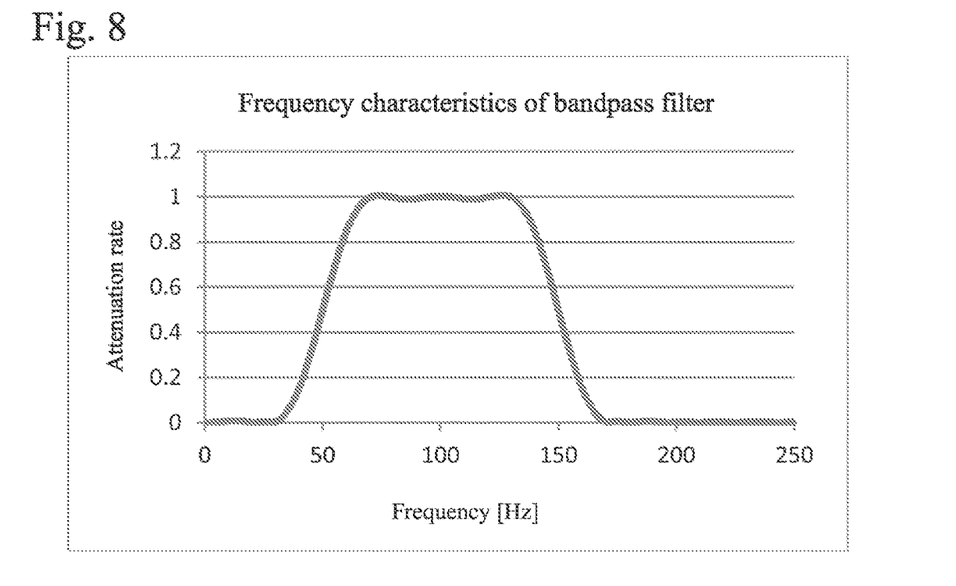
FIG. 8 is a graph illustrating frequency characteristics of the bandpass filter.

FIG. 6 is a block diagram of a bandpass filter used in the present embodiment, FIG. 7 is a table of coefficients of the same bandpass filter, and FIG. 8 is a graph illustrating frequency characteristics of the same bandpass filter. In the present embodiment, the number of taps of the bandpass filter (FIR filter) was set to 29, and the pass band was set to 55 Hz to 145 Hz. As illustrated in FIG. 8, most of the data that passed through the bandpass filter is removed except for frequencies near the natural frequency of 100 Hz.

Next, in Step S106, data processing is performed to calculate absolute values of the extracted values and average the values for a predetermined time (0.5 seconds in the present embodiment). A value after the extraction processing in Step S105 may be directly displayed on the display unit 10. Because the value is fluctuated, such data processing as described above is performed so that a user can easily determine it as a stable value.

Last, in Step S107, the value calculated in Step S106 is displayed as the vibration component Fr of the natural frequency on the display 10.

The sampling frequency, the number of taps and the pass band of the FIR filter, and the duration for averaging are merely examples, and desired values can be used as appropriate. Further, in the present embodiment, filtering was performed by using a digital FIR filter. The filter may consist of another filter such as an IIR filter or an analog circuit.

(Experimental Data)

Figure 4:
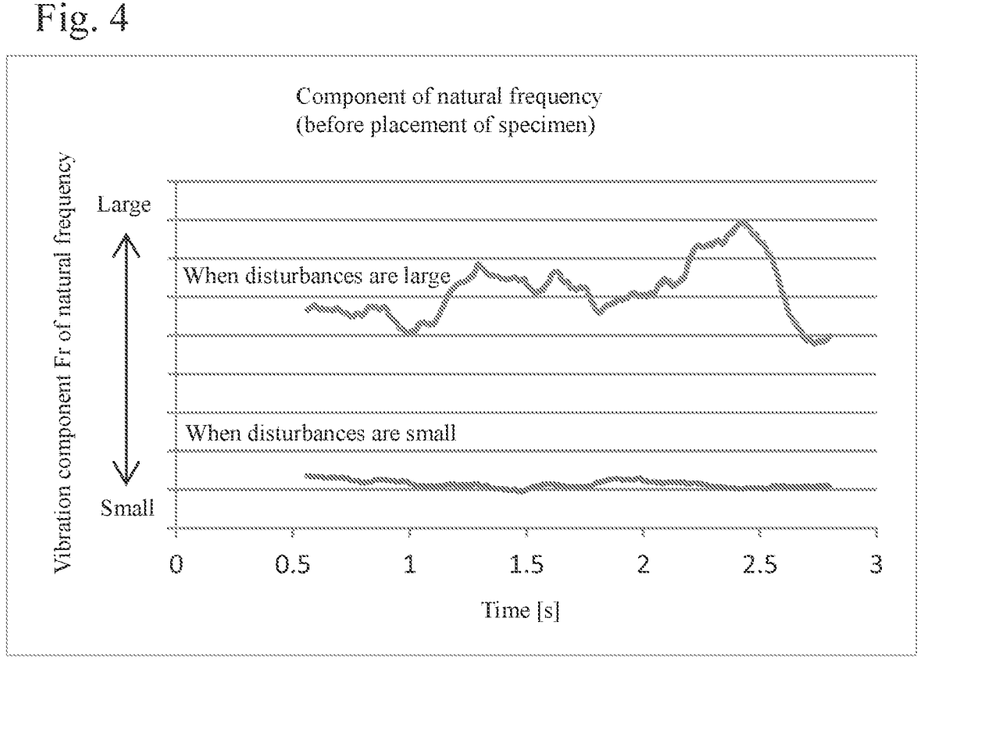
FIG. 4 is a graph illustrating vibration components of a natural frequency of the values in FIGS. 2A and 2B.

FIG. 4 illustrates vibration components Fr of the natural frequency of the output values Zn from the A/D converter in FIGS. 3A and 3B, calculated by the method described above, and illustrates cases where disturbances are large and where disturbances are small in the same graph using the same range of the vertical axis.

As illustrated in FIG. 4, the vibration frequency Fr of the natural frequency is much larger where the disturbances are large than in the case where the disturbances are small. In this way, the magnitude of the vibration component Fr of the natural frequency can be used as an index by a user to recognize the magnitude of the disturbances.

Figure 9A:
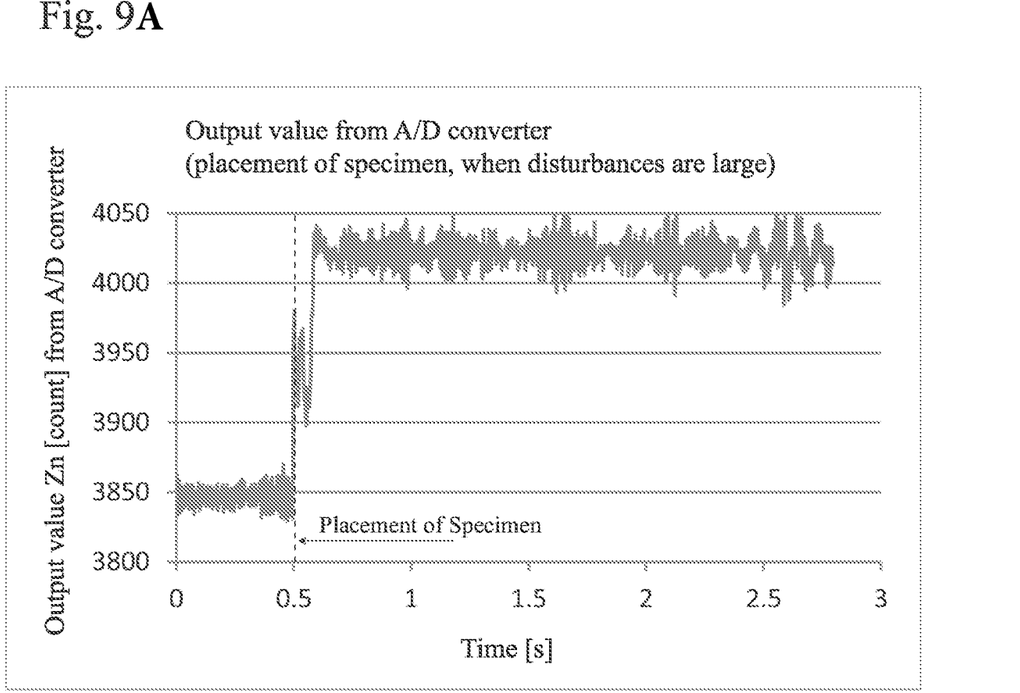
FIGS. 9A and 9B illustrate output values from the A/D converter (placement of a specimen) when disturbances are large and small, respectively.
Figure 9B:
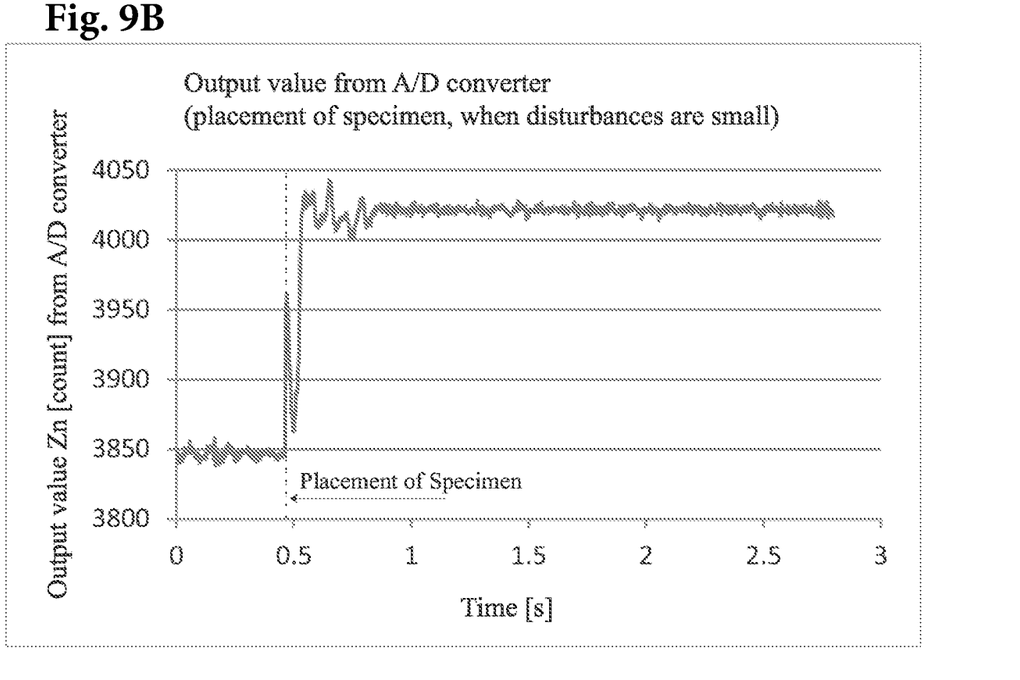
Figure 10A:
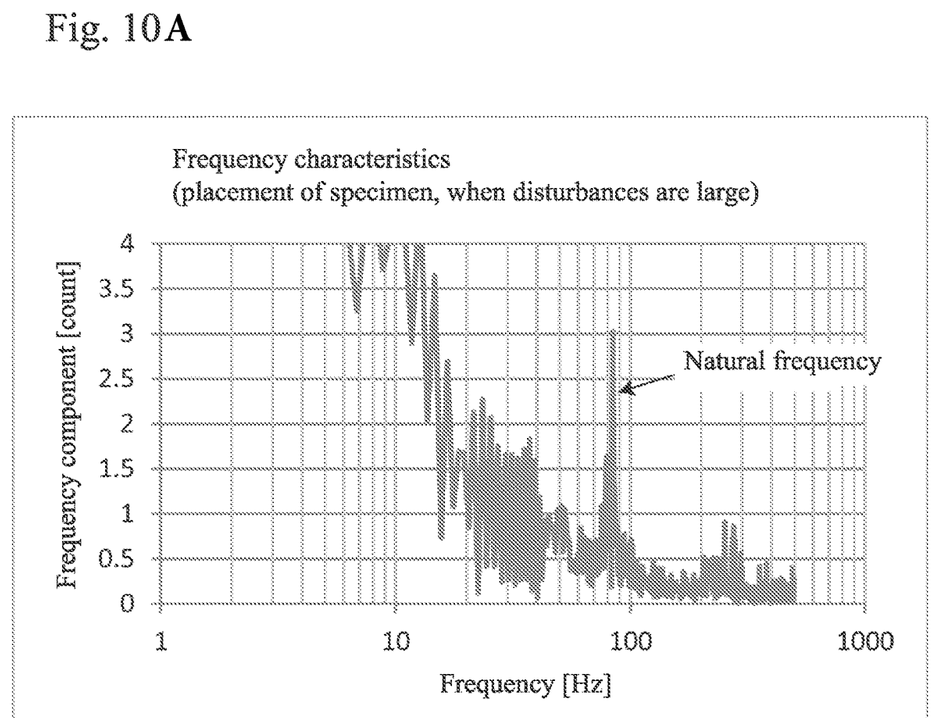
FIGS. 10A and 10B illustrate results of frequency analysis of the values in FIGS. 9A and 9B, respectively.
Figure 10B:
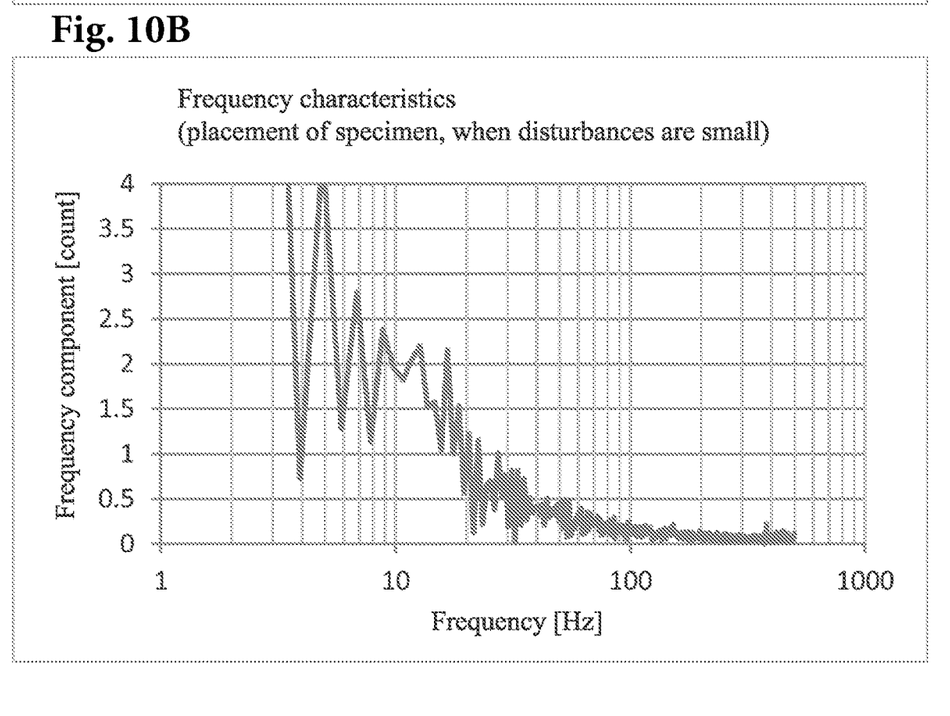
Figure 11:
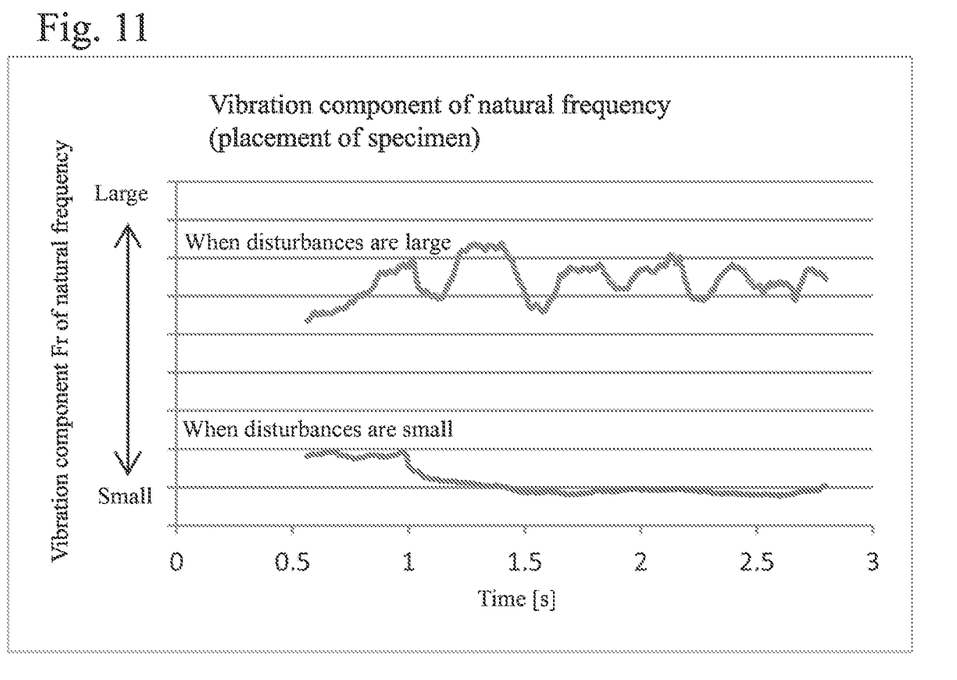
FIG. 11 is a graph illustrating vibration components of the natural frequency of the values in FIGS. 9A and 9B.

As other experimental data, FIGS. 9A and 9B illustrate graphs of output values Zn from the A/D converter 4 when a specimen is placed on the weighing pan. FIG. 9A illustrates a case where disturbances are large (wind speed: 0.5 m/s), and FIG. 9B illustrates a case where disturbances are small (wind speed: 0 m/s). FIGS. 10A and 10B illustrate results of frequency analysis of the output values Zn in FIGS. 9A and 9B. FIG. 11 illustrates vibration components Fr of the natural frequency calculated from the output values Zn in FIGS. 9A and 9B by the method described above, and illustrates cases where the disturbances are large and where disturbances are small in the same graph using the same range of the vertical axis.

As illustrated in FIG. 10A, even in the case where a specimen is placed, when the disturbances are large, the frequency component of the natural frequency of the electronic balance 1 appears large in the output value Zn of the A/D converter 4. On the other hand, comparing FIGS. 3A and 3B and 10A and 10B, it is confirmed that frequency components (particularly, of 40 Hz or less) at frequencies other than the natural frequency are influenced by placement of the specimen. However, by passing through the bandpass filter, this influence is removed, and the influence of placement of the specimen shows almost no effect in the vibration component Fr of the natural frequency as illustrated in FIG. 11. In other words, by using the vibration component Fr of the natural frequency, without the need to wait for convergence of changes in value caused by placement of a specimen as with the weighing value W, a user can recognize the magnitude of a disturbance in real time.

Figure 12:
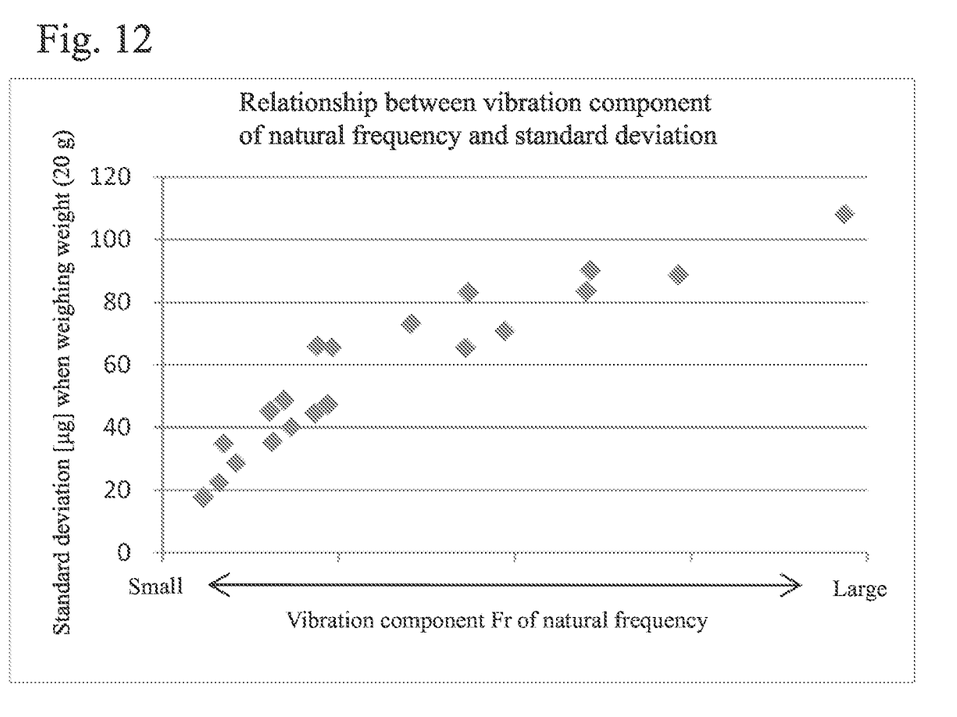
FIG. 12 is a correlation graph of a standard deviation of weighing results and the vibration component of the natural frequency.

FIG. 12 is a correlation graph of a standard deviation of weighing results and the vibration component Fr of the natural frequency. The standard deviation is a numerical value showing the degree of variation of data, and the standard deviation in FIG. 12 was calculated from the results of 10 repetitions of weighing obtained by repeating 10 times weighing of a weight with a mass of 20 g by the electronic balance. At this time, the weighing was performed by changing the magnitude of the disturbance (wind speed: 0 m to 0.5 m/s) around the electronic balance every 10 times.

As illustrated in FIG. 12, as the vibration component Fr of the natural frequency becomes larger, the standard deviation also becomes larger, and repeatability deteriorates. As a disturbance become larger, data variation (standard deviation) also naturally becomes larger, so that a correlation is observed between the magnitude of the disturbance and the vibration component Fr of the natural frequency, and therefore, it was experimentally confirmed that the vibration component Fr of the natural frequency can be used as an index of the magnitude of the disturbance.

Operation and Effect

It is known that various factors (disturbances) including changes in environmental conditions at an installation location of the electronic balance, for example, a sudden change in temperature due to operation of an air conditioner and changes in atmospheric pressure and humidity caused by passage of a low pressure system, as well as operating vibrations of peripheral devices, and generation of wind due to door opening and closing, influence weighing data and hinder highly accurate weighing. For an analytical balance with a weighing value reading accuracy (minimum indication) of 0.1 mg or less, and further, for a microelectronic balance with a weighing value reading accuracy of 1 μg or less, there has been a problem in that, for realizing ultrahigh accuracy, weighing data is subjected to strong filtering and then displayed as a weighing value, and therefore the weighing value does become stable, but it is difficult for a user to recognize fluctuations caused by disturbances. When the weighing results obtained by repeating weighing of a weight varies, it is difficult for a user to determine whether the variation is a performance failure caused by an external factor (disturbance) or a performance failure of the balance main body caused by malfunction or the like.

When disturbances such as wind and vibration influence the electronic balance 1, the electronic balance 1 vibrates at a natural frequency, and the load detection unit 2 detects this vibration, so that the output value Zn as weighing data includes a vibration component of the natural frequency of the electronic balance 1. Therefore, by extracting the vibration component of the natural frequency of the electronic balance 1 from the output value Zn and subjecting to data processing, and displaying on the display unit 10, it is made possible for a user to recognize the magnitude of the disturbance.

For a performance determination of the electronic balance 1, measurement of repeatability by using a weight is effective, however, this poses a problem in which, during the measurement, the electronic balance 1 cannot be used for weighing that the electronic balance 1 is intended to perform. By displaying the vibration component Fr of the natural frequency in real time along with the weighing value W on the display unit 10, a user can simply recognize the magnitude of a disturbance in real time. Accordingly, the user can determine whether a disturbance is negligible, and when the weighing results vary, determine whether the variation was caused by a disturbance or a performance failure of the balance, and further, whether to eliminate a disturbance, and can stabilize the performance of the electronic balance 1.

(Modifications)

In the present embodiment, the vibration component Fr of the natural frequency is displayed together with the weighing value W on the display unit 10, temporal fluctuations may be graphically displayed in real time on a display unit of the external device 14. Further, it is more preferable that both of the weighing value W and the vibration component Fr of the natural frequency are simultaneously displayed in the same graph. A user can visually recognize and intuitively grasp the magnitude of a disturbance.

Figure 13:
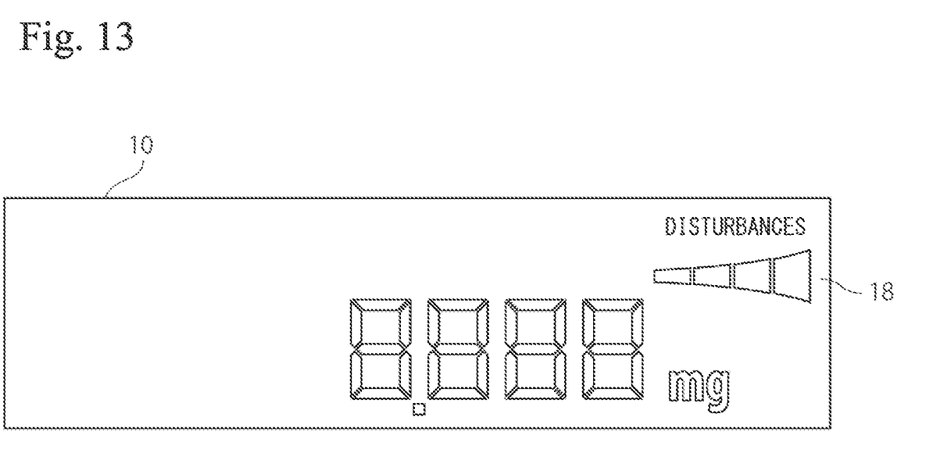
FIG. 13 is a view illustrating an example of a display unit.

As illustrated in FIG. 13, it is also preferable that the vibration component Fr of the natural frequency is indicated as a staged level by an indicator 18 on the display unit 10.

It is also preferable that a warning lamp is configured to be simply turned on when the vibration component Fr of the natural frequency exceeds a certain numerical value.

Although a preferred embodiment and modifications of the present invention have been described above, the embodiment and modifications described above are examples of the present invention, and can be combined based on the knowledge of a person skilled in the art, and such a combined mode is also included in the scope of the present invention.

REFERENCE SIGNS LIST

1 Electronic balance
2 Load detection unit
4 A/D converter
6 Memory
8 Control unit
10 Display unit
12 Input unit
14 External device
18 Indicator
Fr Vibration component of natural frequency
W Weighing value
Zn Output value (from A/D converter)

The invention claimed is:

1. An electronic balance whose natural frequency is known, comprising:
   an electromagnetic force type load measurement mechanism configured to detect and output weighing data;
   a display unit; and
   an arithmetic processing unit that receives weighing data outputted from the measurement mechanism and is configured to extract a vibration component of the natural frequency from the weighing data detected by the load measurement mechanism, and to simultaneously display on the display unit both a magnitude of the vibration component of the natural frequency and a weighing value in real time.

2. The electronic balance according to claim 1, wherein the arithmetic processing unit is configured to display on the display unit the vibration component of the natural frequency by representation using staged levels.

3. The electronic balance according to claim 1, wherein the vibration component of the natural frequency is a value obtained by performing filtering to extract only a vibration component near the natural frequency from the weighing data, and then applying data processing by taking the absolute values and averaging the absolute values for a predetermined time.

* * * * *